United States Patent
Li et al.

(10) Patent No.: US 12,047,618 B1
(45) Date of Patent: Jul. 23, 2024

(54) SEAMLESS AUDIENCE-AWARE ENCODING PROFILE SWITCHING

(71) Applicant: Twitch Interactive, Inc., San Francisco, CA (US)

(72) Inventors: Xiangbo Li, San Diego, CA (US); Selvanayagam Sendurpandian, Livermore, CA (US); Benjamin Hirsch, San Francisco, CA (US); Luke Curley, El Cerrito, CA (US); John Bartos, Brooklyn, NY (US); Nagendra Akula Suresh Babu, San Jose, CA (US); Rohit Puri, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/855,485

(22) Filed: Jun. 30, 2022

(51) Int. Cl.
  *H04N 21/2343* (2011.01)
  *H04N 21/2187* (2011.01)
  *H04N 21/24* (2011.01)

(52) U.S. Cl.
  CPC ..... *H04N 21/2343* (2013.01); *H04N 21/2187* (2013.01); *H04N 21/2407* (2013.01)

(58) Field of Classification Search
  CPC ........... H04N 21/2343; H04N 21/2187; H04N 21/2407
  See application file for complete search history.

(56) References Cited

U.S. PATENT DOCUMENTS

| | | | |
|---|---|---|---|
| 8,713,196 B1 | 4/2014 | Gormley | |
| 9,866,877 B2 | 1/2018 | Shrum et al. | |
| 10,681,398 B1 | 6/2020 | Marcin et al. | |
| 10,958,947 B1 * | 3/2021 | Wei | H04N 21/236 |
| 11,172,010 B1 * | 11/2021 | Woodruff | H04L 7/0008 |
| 11,489,899 B1 * | 11/2022 | Giladi | H04L 65/75 |
| 11,765,418 B1 | 9/2023 | Sendurpandian et al. | |
| 2006/0080171 A1 | 4/2006 | Jardins et al. | |

(Continued)

OTHER PUBLICATIONS

Information technology—Dynamic adaptive streaming over HTTP (DASH)—Part 1: Media presentation description and segment formats; ISO/IEC 23009-1; International Standard; Second Edition; May 2014; 152 pages.

(Continued)

*Primary Examiner* — Alazar Tilahun
(74) *Attorney, Agent, or Firm* — BakerHostetler

(57) ABSTRACT

A first portion of a video item is transmitted using a first encoding profile. The first encoding profile is a first set of one or more first video representations of the video item having first image quality characteristics. Viewer information including at least one of a viewer quantity for the video item or a viewer playback platform distribution for the video item is receiving during transmitting the video item. A second encoding profile is determined based on the at least one of the viewer quantity or the viewer playback platform distribution. The second encoding profile is a second set of one or more second video representations of the video item having second image quality characteristics. The second image quality characteristics include a selected image quality characteristic that is not included in the first image quality characteristics. A second portion of the video item is transmitted using the second encoding profile.

20 Claims, 8 Drawing Sheets

(56) References Cited

U.S. PATENT DOCUMENTS

| | | |
|---|---|---|
| 2008/0273591 A1 | 11/2008 | Brooks et al. |
| 2013/0054827 A1 | 2/2013 | Feher et al. |
| 2013/0117418 A1 | 5/2013 | Mutton et al. |
| 2014/0139733 A1 | 5/2014 | MacInnis et al. |
| 2016/0191961 A1 | 6/2016 | Fisher et al. |
| 2016/0286244 A1 | 9/2016 | Chang et al. |
| 2017/0223394 A1 | 8/2017 | Gavade et al. |
| 2018/0302452 A1 | 10/2018 | Pantos et al. |
| 2020/0358835 A1 | 11/2020 | Cezano et al. |

OTHER PUBLICATIONS

"Per-Title Encode Optimization"; https://netflixtechblog.com/per-title-encode-optimization-7e99442b62a2; Netflix Technology Blog; Dec. 2015; accessed Mar. 14, 2023; 15 pages.

Manohara et al.; "Optimized shot-based encodes: Now Streaming!"; https://netflixtechblog.com/optimized-shot-based-encodes-now-streaming-4b9464204830; Netflix Technology Blog; Mar. 2018; accessed Mar. 14, 2023; 10 pages.

"Context Aware Encoding: Building a Better Mousetrap"; Brightcove Inc., Sep. 2017, www.brightcove.com/en/resources/blog/context-aware-encoding-building-better-mousetrap/; web-archive capture from May 16, 2022, accessed on Mar. 13, 2023 from https:/web.archive.org/web/20220516174837/https://www.brightcove.com/en/resources/blog/context-aware-encoding-building-better-mousetrap/; 2 pages.

Ben Dodson; "How Audience Adaptive Encoding Works"; https://www.mux.com/blog/how-audience-adaptive-encoding-works; Mux Inc.; May 2019; accessed Mar. 14, 2023; 2 pages.

"More Efficient Mobile Encodes for Netflix Downloads"; https://netflixtechblog.com/more-efficient-mobile-encodes-for-netflix-downloads-625d7b082909; Netflix Technology Blog; Dec. 2016; accessed Mar. 14, 2023; 8 pages.

Klint Finley; "Think Video on Your Phone Is Slow? It's Not Your Imagination"; https://www.wired.com/story/video-phone-slow-not-your-imagination/; Wired; Aug. 2019; accessed Mar. 15, 2023; 10 pages.

\* cited by examiner

FIG. 5

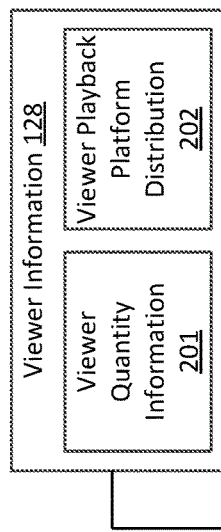

Manifest 501 (e.g., for a first encoding profile)

```
#EXTM3U
#EXT-X-MEDIA:TYPE=VIDEO,GROUP-ID="chunked",NAME="1080p60 (source)",AUTOSELECT=YES,DEFAULT=YES
#EXT-X-STREAM-INF:BANDWIDTH=5132400,RESOLUTION=1920x1080,CODECS="avc1.64002A,mp4a.40.2",VIDEO="chunked",FRAMERATE=60.000
https://cdn_url/v1/playlist/1080p60.m3u8
```

Manifest 502 (e.g., for a second encoding profile)

```
#EXTM3U
#EXT-X-MEDIA:TYPE=VIDEO,GROUP-ID="chunked",NAME="1080p60 (source)",AUTOSELECT=YES,DEFAULT=YES
#EXT-X-STREAM-INF:BANDWIDTH=5132400,RESOLUTION=1920x1080,CODECS="avc1.64002A,mp4a.40.2",VIDEO="chunked",FRAMERATE=60.000
https://cdn_url/v1/playlist/1080p60.m3u8
#EXT-X-MEDIA:TYPE=VIDEO,GROUP-ID="720p60",NAME="720p60",AUTOSELECT=YES,DEFAULT=YES
#EXT-X-STREAM-INF:BANDWIDTH=3464999,RESOLUTION=1280x720,CODECS="avc1.4D401F,mp4a.40.2",VIDEO="720p60",FRAME-RATE=60.000
https://cdn_url/v1/playlist/720p60.m3u8
#EXT-X-MEDIA:TYPE=VIDEO,GROUP-ID="480p30",NAME="480p",AUTOSELECT=YES,DEFAULT=YES
#EXT-X-STREAM-INF:BANDWIDTH=1469999,RESOLUTION=852x480,CODECS="avc1.4D401F,mp4a.40.2",VIDEO="480p30",FRAME-RATE=30.000
https://cdn_url/v1/playlist/480p30.m3u8
#EXT-X-MEDIA:TYPE=VIDEO,GROUP-ID="360p30",NAME="360p",AUTOSELECT=YES,DEFAULT=YES
#EXT-X-STREAM-INF:BANDWIDTH=630000,RESOLUTION=640x360,CODECS="avc1.4D401F,mp4a.40.2",VIDEO="360p30",FRAME-RATE=30.000
https://cdn_url/v1/playlist/360p30.m3u8
#EXT-X-MEDIA:TYPE=VIDEO,GROUP-ID="160p30",NAME="160p",AUTOSELECT=YES,DEFAULT=YES
#EXT-X-STREAM-INF:BANDWIDTH=230000,RESOLUTION=284x160,CODECS="avc1.4D401F,mp4a.40.2",VIDEO="160p30",FRAME-RATE=30.000
https://cdn_url/v1/playlist/160p.m3u8
```

SEAMLESS AUDIENCE-AWARE ENCODING PROFILE SWITCHING

BACKGROUND

Video may be encoded and transmitted using a respective encoding profile. An encoding profile, as that term is used herein, refers to a set of one or more video representations into which at least part of a video item is encoded. Each video representation within the encoding profile has its own respective image quality characteristics, such as a respective resolution, a respective bitrate, etc. For scenarios in which an encoding profile includes a plurality of video representations, each of the video representations will include at least partially different image quality characteristics. For example, an encoding profile may include a plurality of video representations that each have a different resolution (e.g., 780p, 480p, 360p, 160p). The use of a plurality of video representations having different image qualities may allow each video player to select an image quality that is best for its respective network conditions. For example, a video player with a strong network connection may select a video representation with a higher image quality (e.g., 780p), while another video player with a less strong connection may select another video representation with a less high image quality (e.g., 480p). While offering a greater quantity of video representations may assist video players by providing more choices from which to select a desired image quality, there may also be expenses (e.g., use of server computing resources) associated with encoding and providing additional video representations.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 5 is a diagram illustrating example manifests that may be used in accordance with the present description.

DETAILED DESCRIPTION

Figure 1:
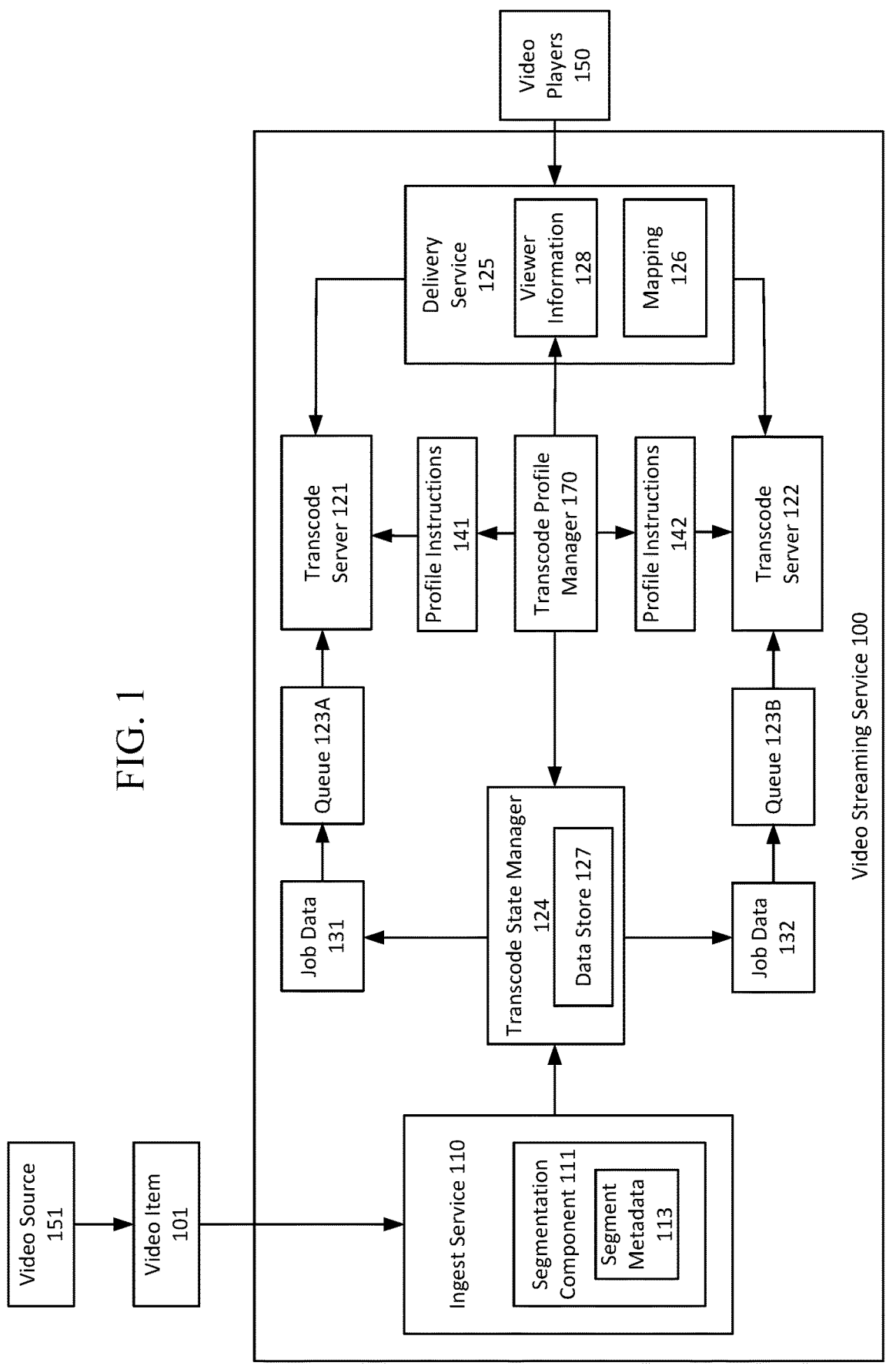
FIG. 1 is a diagram illustrating an example seamless audience-aware encoding profile switching system that may be used in accordance with the present description.

Techniques for seamless audience-aware encoding profile switching are described herein. In some examples, a video item may be transmitted from a video source to a video streaming service, which, in turn, may transmit the video item to one or more viewers. For example, a video game player may sometimes capture video of himself or herself playing a video game, such as using video capture software. The game player may then transmit this game video from his or her computer, which may be the video source, to a video streaming service. The video streaming service may, in turn, transmit the game video to large quantities of remote viewers. The video streaming service may transcode the video item by decoding the video item from a first format and then re-encoding it into one or more other formats. The process of transcoding the video item may be performed by transcode servers, which may produce transcoded video segments and playlists that correspond to the transcoded video segments. The playlists may be provided to video players and may be used by the video players to request the transcoded video segments. The video players may then request and receive the transcoded video segments and then play the video item.

The video item may be transmitted and played using streaming techniques, in which portions of transmitted video item are received and played while subsequent portions of the transmitted video item are being transmitted. In some examples, the video item may be live a streaming item. The term live streaming, as used herein, refers to scenarios in which a video item of an event (e.g., a video game) may be transmitted to viewers, and at least part of the video item may be played while the event is still occurring (e.g., while the video game is still being played by the players), albeit with some small amounts latency between the time that video item is captured and the time that the video is eventually played to viewers.

According to the techniques described herein, during transmission of a video item, viewer information for the video item may be obtained and repeatedly updated. The viewer information may include, for example, viewer quantity and viewer playback platform distribution. The viewer quantity may be a quantity of viewers that are receiving transmission of the video item at any given time. The viewer playback platform distribution may indicate a distribution of viewer playback platforms among viewers of the video item at any given time. A viewer playback platform refers to characteristics of a computing device, computing network and/or other computing resources that assist in playback of the video item to a viewer, such as characteristics of computing devices (e.g., including device type, display mode, etc.) on which the video item is played and/or characteristics of networks (e.g., types of network service providers) used to transmit the video item. For example, the viewer playback platform distribution may indicate an amount (e.g., percentage) of viewers that are receiving transmission of the video item via a wireless service provider in comparison to an amount (e.g., percentage) of viewers that are receiving transmission of the video item via a land-based service provider. As another example, the viewer playback platform distribution may indicate an amount (e.g., percentage) of viewers that are viewing the video item via a mobile computing devices (e.g., smartphones, etc.) in comparison to an amount (e.g., percentage) of viewers that are viewing the video item via web-based computing devices (e.g., laptops, smart televisions, etc.). As yet another example, the viewer playback platform distribution may indicate an amount (e.g., percentage) of viewers that are viewing the video item in landscape mode in comparison to an amount (e.g., percentage) of viewers that are viewing the video item in portrait mode.

As described herein, the above-described viewer information may be used to periodically adjust the encoding profile of the video item during transmission of the video item. In some examples, the encoding profile may be adjusted in real-time to reflect changes in viewer information as those changes occur. For example, a first portion of a video item may be transmitted from a streaming service to video players using a first encoding profile. During transmission of the video item, the above-described viewer information may be used to determine a second encoding profile to which to switch the video item during transmission of the video item. The second encoding profile is at least partially different from the first encoding profile. This means that the second encoding profile includes at least one video representation having an image quality characteristic (e.g., resolution, bitrate, etc.) that was not provided by any video representations within the first encoding profile (or vice-versa). In one specific example, the second encoding profile may include a video representation having a resolution that was not provided by any video representations within the first encoding profile. In another specific example, the second encoding profile may include a video representation having a bitrate that was not provided by any video representations within the first encoding profile.

Thus, the techniques described herein may allow the second encoding profile for the video item to be selected, during transmission of the video item, based on viewer information for the video item. For example, in some cases, due to the added expense required to encode additional video representations, it may not be cost effective to encode additional video representations for a video item until the viewership of the video item reaches a selected threshold quantity (e.g., one-thousand viewers). Thus, in some examples, when the viewership for a video item rises above the selected threshold quantity, the techniques described herein may allow additional video representations of the video item to be added via the second, or a subsequent, encoding profile. By contrast, in some examples, when the viewership drops below the selected threshold quantity, one or more existing video representations may be removed via the second, or a subsequent, encoding profile.

In addition to determining the quantity of video representations in the second encoding profile, the viewer information may also be used to determine the respective image quality characteristics of those video representations. For example, in some cases, due to network conditions and/or wireless carrier throttling, wireless service providers and smartphones/mobile computing devices may be less likely to provide a high quality of network service than land-based service providers and web-based computing devices. Thus, in some example, if the majority of viewer playback platforms include land-based service providers and/or web-based computing devices, it may be beneficial to include a high image quality (e.g., 780p) video representation. By contrast, if the majority of viewer playback platforms include wireless service providers and/or mobile computing devices, it may not be beneficial to include a high image quality (e.g., 780p) video representation, as this would waste the extra bitrate and computing costs. Also, in some examples, a higher resolution and/or other image quality characteristics may sometimes be made available when a majority of viewers are viewing the video item in landscape mode as opposed to portrait mode, as the video player may often occupy a larger screen area in landscape mode as opposed to portrait mode. Thus, the techniques described herein may allow seamless switching of encoding profiles during transmission of a video item. For example, the techniques described herein may allow a video item to be seamlessly switched from a first encoding profile to a second encoding profile having a different quantity of video representations and at least partially different image quality characteristics than the first encoding profile. The encoding profile switching techniques described herein may be seamless, for example because transmission of the video item to video players may not be interrupted to enable switching of the encoding profiles and also because the video players may not be caused to skip or repeat playing of portions of the video item to enable switching of the encoding profiles.

One problem related to some existing transcoding techniques is that a single encoding profile may be applied to a video item at the start of transmission of the video item and may continue to be applied to the video item throughout the entire transmission. These existing techniques may be problematic because they may provide too few, or too many, video representations in comparison to the viewer quantities for the video item, particularly as those quantities change throughout the transmission. For example, it may lower viewer satisfaction to only provide a single video representation to high quantities of viewers. By contrast, it may be waste bitrate and computing resources to provide several available video representations for video items with lower quantities of viewers. Additionally, these existing techniques may be problematic because the selected image qualities may not match the viewer playback platform distribution. For example, if the majority of viewers are wireless/mobile viewers, it may be wasteful to generate a high image quality (e.g., 780p) representation. By contrast, if the majority of viewers are land-based/web-based, it may lower viewer satisfaction if a high image quality version is not made available.

In some examples, the techniques described herein may be particularly advantageous for live streaming contexts. One reason for this is that, for live streaming, the video context may not be known in advance, which may make it difficult to predict how many, and what types, of viewers will receive a given video item. As low latency is essential for live streaming, analyzing the video context in real-time may be time consuming, and applying historical data for live streaming can be problematic as well. Moreover, for live streaming, there is less time, and likely fewer available computing resources, for generating additional video representations, for example in comparison to video on demand scenarios.

FIG. 1 is a diagram illustrating an example seamless audience-aware encoding profile switching system that may be used in accordance with the present description. As shown in FIG. 1, video item 101 may be transmitted from video source 151 to video streaming service 100. The video streaming service 100 may then, in turn, transmit the video item 101 to video players 150. The video item 101 may be transmitted, from video source 151 to video streaming service 100, and from video streaming service 100 to video players 150, over one or more local area networks (LAN's) and/or one or more wide area networks (WAN's), such as the Internet. In one specific example, video item 101 may be game video. For example, a video game player may sometimes capture video of himself or herself playing a video game, such as using video capture software. The game player may then transmit this game video from his or her computer, which may be the video source 151, to video streaming service 100. The video item 101 may be transmitted and played using streaming techniques, in which portions of the video item 101 are received and played while subsequent portions of the video item 101 are being transmitted. In some examples, the video item 101 may be live streaming content.

As shown in FIG. 1, the video item 101 may be received, at video streaming service 100, by an ingest service 110. The ingest service 110 may initiate video processing by calling a transcode state manager 124, for example via a call of an application programming interface (API) of the transcode state manager 124 (e.g., a create transcode API call). In response to this call, the transcode state manager 124 may create an entry, in data store 127, for the job of transcoding of the video item 101. This entry may include, for example, a transcode identifier (ID) for the job of transcoding video item 101, a stream ID for the video stream created by that job, a transcode server ID for the transcode server that performs the job, and other metadata. The transcode state manager 124 may also create job data 131, which is data associated with the job of the transcoding of the video item 101. The job data 131 may be enqueued in the queue 123A (and/or optionally queue 123B or other additional queues).

The video streaming service 100 may operate a transcode server pool, which may include transcode server 121, transcode server 122 and optionally any number of other transcode servers (not shown in FIG. 1). The transcode servers in the transcode server pool may consume job data from the queues 123A-B and optionally other additional queues (not shown in FIG. 1). In the example of FIG. 1, transcode server 121 retrieves, from queue 123A, job data 131 associated with the job of transcoding video item 101.

In some examples, the job data 131 retrieved by transcode server 121 may include a profile indicator, which may be used by the transcode server 121 to request, and receive, profile instructions 141 from transcode profile manager 170. The profile instructions 141 are instructions that indicate an initial encoding profile for the video item 101. The profile instructions 141 may indicate a quantity of video representations that will be included in the initial encoding profile. Additionally, the profile instructions 141 may indicate image quality characteristics for the initial encoding profile. For example, for each video representation that is included in the initial encoding profile, the profile instructions 141 may indicate respective image quality characteristics, such as a resolution value and a bitrate value, for that video representation.

In some examples, such as for some live streaming scenarios, it may be advantageous to initiate transmission of the video item 101 using only a single video representation that has the source image quality characteristics, which are the image quality characteristics that are used to transmit the video item from the video source 151 to the video streaming service 100. Using only the source image characteristics may reduce the cost and time required to achieve minimal latency that is desired for live broadcasts. Thus, the in some examples, the initial encoding profile may include only a transmux video representation. In the transmux process, the video item 101 is transmitted using the source image characteristics, changing only the format of the video item 101, without decoding and re-encoding the video item 101. Accordingly, in some examples, profile instructions 141 may include instructions to provide only a single video representation of the video item 101 that has the source image characteristics.

Upon obtaining the job data 131 and the profile instructions 141, the transcode server 121 may start processing the video item 101. Specifically, the transcode server 121 may produce video segments and playlists for video item 101. In particular, the transcode server 121 may produce the video segments and playlists in accordance with the initial encoding profile that is indicated by profile instructions 141. For example, the transcode server may provide each of the video representations of the initial encoding profile of the video item 101 having the respective image characteristics that are indicated by the profile instructions 141.

The video players 150 request the playlists and segments, and the delivery service 125 calls the transcode server 121 to get the segments and playlists. The transcode server 121 may inform the transcode state manager 124 that it is performing the job of transcoding video item 101, and the transcode state manager may update the entry for the job in data store 127 with a transcode server ID for transcode server 121. In some examples, the transcode server 121 may inform the transcode state manager 124 that it is performing the job of transcoding video item 101 after the transcode server 121 has produced a full segment of the video item 101.

As shown in FIG. 1, the ingest service 110 includes a segmentation component 111 that divides the video item 101 into segments. The segmentation component 111 may generate segment metadata 113 that may be sent, along with the video item 101, to transcode server 121. The segment metadata 113 may include segment start metadata tags. In particular, based on a segmentation algorithm, whenever the segmentation component 111 decides to start a new segment, it may generate and send a segment start metadata tag right before the new segment, thereby indicating the frame on which the new segment is to begin. The segment start metadata tag may include timestamp information (e.g., decode timestamp and composition timestamp) and instantaneous decoder refresh (IDR) information, which allows the transcode server 121 to process and output a corresponding segment sequence number and presentation timestamp later on. As described below, the segment metadata 113 may assist in allowing the encoding profile switching to be performed seamlessly.

Figure 2:
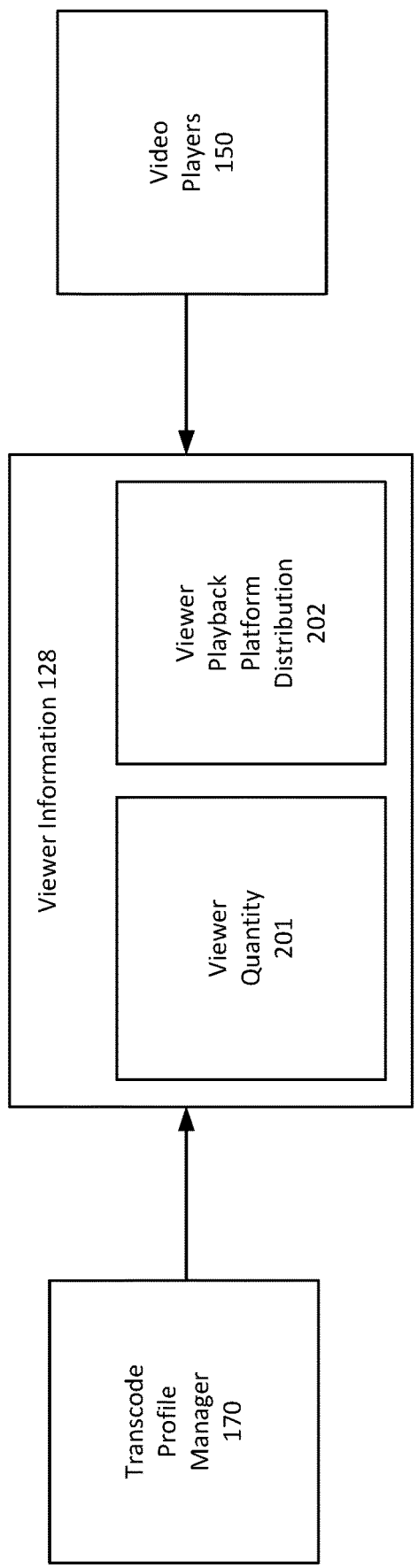
FIG. 2 is a diagram illustrating example viewer information that may be used in accordance with the present description.

As shown in FIG. 1, delivery service 125 obtains viewer information 128 based on data from video players 150. For example, video players 150 may collect and provide information to delivery service 125 regarding the types of computing devices on which video item 101 is being played, the type of network connection 101 over which the video item 101 is being received, the viewing orientation (e.g., portrait mode or landscape mode) of the computing devices on which video item 101 is being played, and other information. Referring now to FIG. 2, it is shown that viewer information 128 may include viewer quantity 201 and viewer playback platform distribution 202. The viewer quantity 201 may be a quantity of viewers that are receiving transmission of the video item 101 at any given time. The viewer playback platform distribution 202 may indicate a distribution of viewer playback platforms among viewers of the video item 101 at any given time. A viewer playback platform refers to characteristics of a computing device, computing network and/or other computing resources that assist in playback of the video item 101 to a viewer, such as characteristics of computing devices (e.g., including device type, display mode, etc.) on which the video item 101 is played and/or characteristics of networks (e.g., types of network service providers) used to transmit the video item 101. For example, the viewer playback platform distribution 202 may indicate an amount (e.g., percentage) of viewers that are receiving transmission of the video item 101 via a wireless service provider in comparison to an amount (e.g., percentage) of viewers that are receiving transmission of the video item 101 via a land-based service provider. As another example, the viewer playback platform distribution 202 may indicate an amount (e.g., percentage) of viewers that are viewing the video item 101 via mobile computing devices (e.g., smartphones, etc.) in comparison to an amount (e.g., percentage) of viewers that are viewing the video item 101 via web-based computing devices (e.g., laptops, smart televisions, etc.). In one specific example, the viewer playback platform distribution 202 may indicate an amount (e.g., percentage) of viewers that are viewing the video item 101 via smartphones in comparison to an amount (e.g., percentage) of viewers that are viewing the video item 101 via non-smartphone computing devices (e.g., laptops, smart televisions, etc.). As yet another example, the viewer playback platform distribution 202 may indicate an amount (e.g., percentage) of viewers that are viewing the video item 101 in landscape mode in comparison to an amount (e.g., percentage) of viewers that are viewing the video item 101 in portrait mode.

Referring back to FIG. 1, it is shown that the transcode profile manager 170 may periodically access viewer information 128. The transcode profile manager 170 may use the viewer information 128 to periodically adjust the encoding profile of the video item 101 during transmission of the video item 101. In some examples, the encoding profile may be adjusted in real-time to reflect changes in viewer information 128 as those changes occur. For example, a first portion of the video item 101 may be transmitted from the video streaming service 100 to video players 150 using a first (e.g., initial) encoding profile (e.g., as indicated by profile instructions 141). During transmission of the video item 101, the viewer information 128 may be used to determine a second encoding profile to which to switch the video item 101 during transmission of the video item 101. The second encoding profile is at least partially different from the first encoding profile. This means that the second encoding profile includes at least one video representation having an image quality characteristic (e.g., resolution, bitrate, etc.) that was not provided by any video representations within the first encoding profile (or vice-versa). In one specific example, the second encoding profile may include a video representation having a resolution that was not provided by any video representations within the first encoding profile. In another specific example, the second encoding profile may include a video representation having a bitrate that was not provided by any video representations within the first encoding profile.

Accordingly, the transcode profile manager 170 may select the second encoding profile for the video item 101, during transmission of the video item 101, based on viewer information 128 for the video item 101. For example, in some cases, due to the added expense required to encode additional video representations, it may not be cost effective to encode additional video representations for video item 101 until the viewership of the video item reaches a selected threshold quantity (e.g., one-thousand viewers). Thus, in some examples, when the viewership for video item 101 rises above the selected threshold quantity, the transcode profile manager 170 may cause additional video representations of the video item 101 to be added via the second, or a subsequent, encoding profile. By contrast, in some examples, when the viewership drops below the selected threshold quantity, one or more existing video representations may be removed via the second, or a subsequent, encoding profile.

The transcode profile manager 170 may also use the viewer information 128 to determine the respective image quality characteristics of the video representations within the second encoding profile. For example, in some cases, due to network conditions and/or wireless carrier throttling, wireless service providers and smartphones/mobile computing devices may be less likely to provide a high quality of network service than land-based service providers and web-based computing devices. Thus, in some example, if the majority of viewer playback platforms include land-based service providers and/or web-based computing devices, it may be beneficial to include a high image quality (e.g., 780p) video representation. By contrast, if the majority of viewer playback platforms include wireless service providers and/or mobile computing devices, it may not be beneficial to include a high image quality (e.g., 780p) video representation, as this would waste the extra bitrate and computing costs. Also, in some examples, a higher resolution and/or other image quality characteristics may sometimes be made available when a majority of viewers are viewing the video item in landscape mode as opposed to portrait mode, as the video players 150 may often occupy a larger screen area in landscape mode as opposed to portrait mode.

In some examples, when the transcode profile manager 170 determines to switch video item 101 to a second encoding profile and selects characteristics of the second encoding profile, the transcode profile manager 170 may generate profile instructions 142, which are instructions that indicate the second encoding profile for the video item 101. The profile instructions 142 may indicate a quantity of video representations that will be included in the second encoding profile. Additionally, the profile instructions 142 may indicate image quality characteristics for the second encoding profile. For example, for each video representation that is included in the second encoding profile, the profile instructions 142 may indicate respective image quality characteristics, such as a resolution value and a bitrate value, for that video representation. In one specific example, the second encoding profile may be a 780p encoding ladder, for example which has four video representations having respective resolutions of 720p, 480p, 360p and 160p. In another specific example, the second encoding profile may be a 480p encoding ladder, for example which has three video representations having respective resolutions of 480p, 360p and 160p.

Additionally, when the transcode profile manager 170 determines to switch video item 101 to the second encoding profile and selects characteristics of the profile encoding profile, the transcode profile manager 170 may send an indication to switch encoding profiles for video item 101 to the transcode state manager 124. Upon receiving this indication to switch video item 101 to the second encoding profile, the transcode state manager 124 may clone the entry for video item 101 in data store 127. The transcode state manager 124 may also create job data 132, which is data associated with the job of the transcoding of the video item 101 according to profile instructions 142. Job data 132 may have an indicator denoting that the job data 132 is created for a switching request. The job data 132 may also include a profile indication for requesting profile instructions 142 from the transcode profile manager 170. The job data 132 may be enqueued in the queue 123B (and/or optionally queue 123B or other additional queues). In the example of FIG. 1, the job data 132 is retrieved, form queue 123B, by transcode server 122.

Upon retrieval of the job data 132, the transcode server 122 may use the profile indicator in job data 132 to request, and receive, profile instructions 142 from transcode profile manager 170. The transcode server 122 may also start processing the video item 101 by fetching it from the ingest service 110. Upon receipt of both the job data 132 and the profile instructions 142, the transcode server 122 may start producing the segments and playlists for the video item 101. In particular, the transcode server 122 may produce the video segments and playlists in accordance with the second encoding profile that is indicated by profile instructions 142. For example, the transcode server 122 may provide each of the video representations of the second encoding profile of the video item 101 having the respective image characteristics that are indicated by the profile instructions 142.

The transcode server 122 may then notify the transcode state manager 124 that it is ready to take over the video delivery for the video item 101. Because this is a switch job, the transcode server 122 may wait until it has produced at least a full playlist of segments to send this notification to the transcode state manager 124. This may help to ensure a seamless switch from the transcode server 121 to the transcode server 122, such as by ensuring that the video players 150 aren't switched to transcode server 122 before the transcode server 122 has produced at least a full playlist of segments. The transcode state manager 124 may update the cloned entry for video item 101 in data store 127 to indicate that transcode server 122 is performing the transcode job for video item 101.

Similar to transcode server 121, transcode server 122 may also receive the segment metadata 113 from the segmentation component 111 along with the video item 101. As described above, the segment metadata 113 may include segment start metadata tags. In particular, based on a segmentation algorithm, whenever the segmentation component 111 decides to start a new segment, it may generate and send a segment start metadata tag right before the new segment, thereby indicating the frame on which the new segment is to begin. The segment start metadata tag may include timestamp information (e.g., decode timestamp and composition timestamp) and instantaneous decoder refresh (IDR) information, which allows the transcode server 122 to process and output a corresponding segment sequence number and presentation timestamp later on. The segment metadata 113, therefore, allows both transcode server 121 and transcode server 122 to connect to video item 101 and to produce aligned and synchronized segments and playlists. This allows seamless switching of the transcoding of video item 101 from transcode server 121 to transcode server 122 without interrupting playback of the video item 101. The segmentation component 111 may be external to the transcode servers 121 and 122 and may communicate with the transcode servers 121 and 122, thereby allowing segmentation of the video item 101 to be aligned across the transcode servers 121 and 122.

As shown in FIG. 1, the delivery service 125 includes mapping 126, which may indicate which transcode servers are producing which video streams. The mapping 126 may be built as a cache whose mapping entries are refreshed at regular intervals, such as intervals of a selected number of minutes. The delivery service 125 may request the transcode state manager 124 to provide (e.g., based on data store 127) the transcode server ID for a transcode server associated with a given video stream. The delivery service 125 may then cache an entry in mapping 126 to associate the transcode server ID with the given video stream. As a specific example, for the video stream associated with video item 101, when the delivery service 125 makes a request to the transcode state manager 124 after transcode server 122 is ready to produce segments and playlists for video item 101, the transcode server may provide the transcode server ID for transcode server 122. The delivery service 125 may then cache an entry in mapping 126 to associate the transcode server ID for transcode server 122 with the video stream for video item 101. Based on this entry in mapping 126, the delivery service 125 may fetch subsequent playlists and segments from transcode server 122 instead of transcode server 121. The transcode state manager 124 may remove the initial transcode entry in data store 127 corresponding to the transcode server 121, for example after waiting a selected time period from when it served the new transcode server information (i.e., the indication of the transcode server 122) to the delivery service 125. The removal of this initial transcode entry may signal the transcode server 121 to stop processing the video stream for video item 101.

When a transcoding session has been successfully started on a new transcoder server (e.g., transcode server 122 in FIG. 1), the delivery service 125 may dynamically route the segment and playlist request to the new transcode server. Since the encoding profile has changed, all variant playlists may need to be updated. Some streaming protocols, such as (DASH), which stands for Dynamic Adaptive Streaming over Hypertext Transfer Protocol (HTTP), allow appending a new period to a master manifest, where new variants can be inside a new period. The master manifest may be refreshed periodically, therefore the whole encoding profile switching can be done seamlessly.

Figure 3:
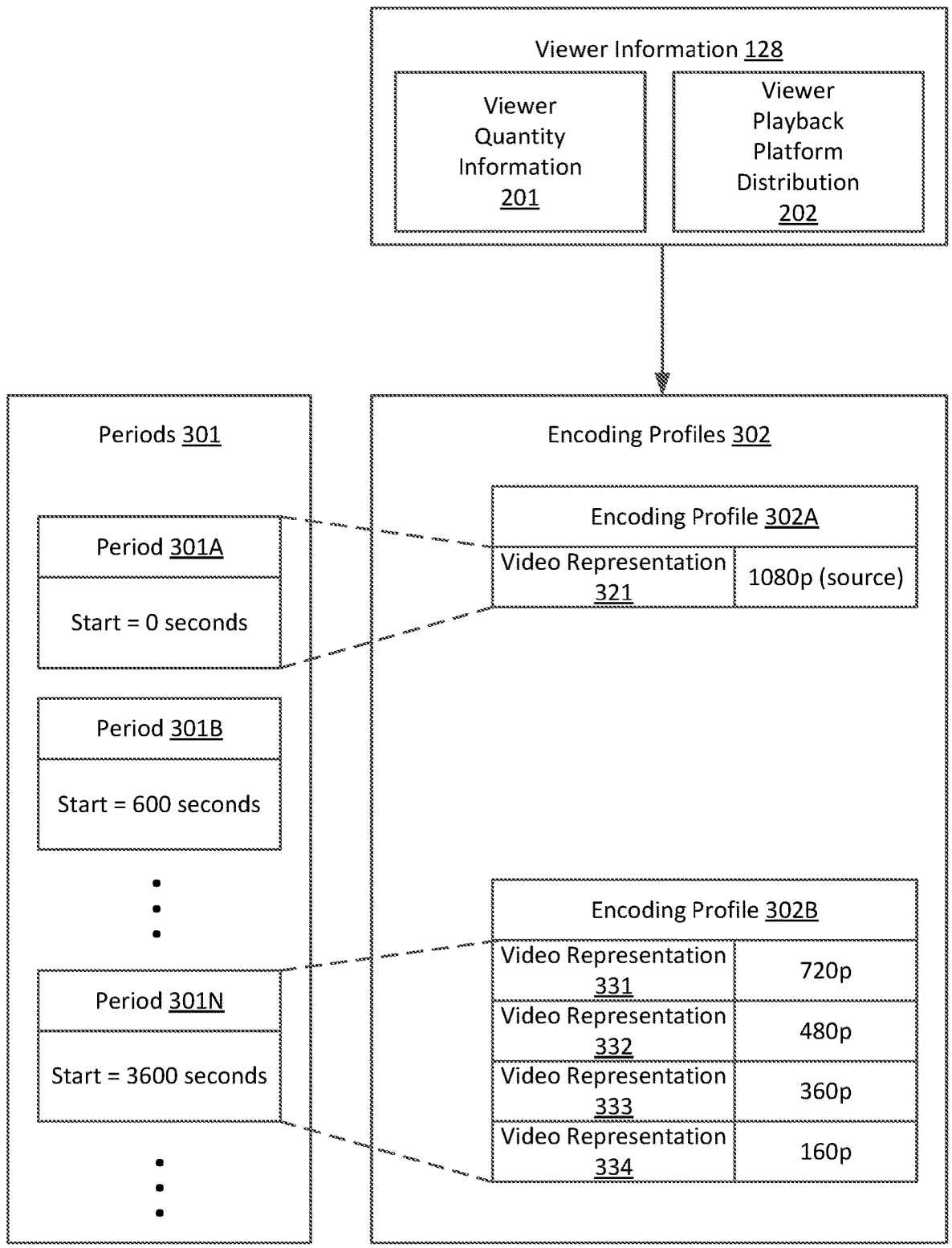
FIG. 3 is a diagram illustrating first example encoding profiles that may be used in accordance with the present description.
Figure 4:
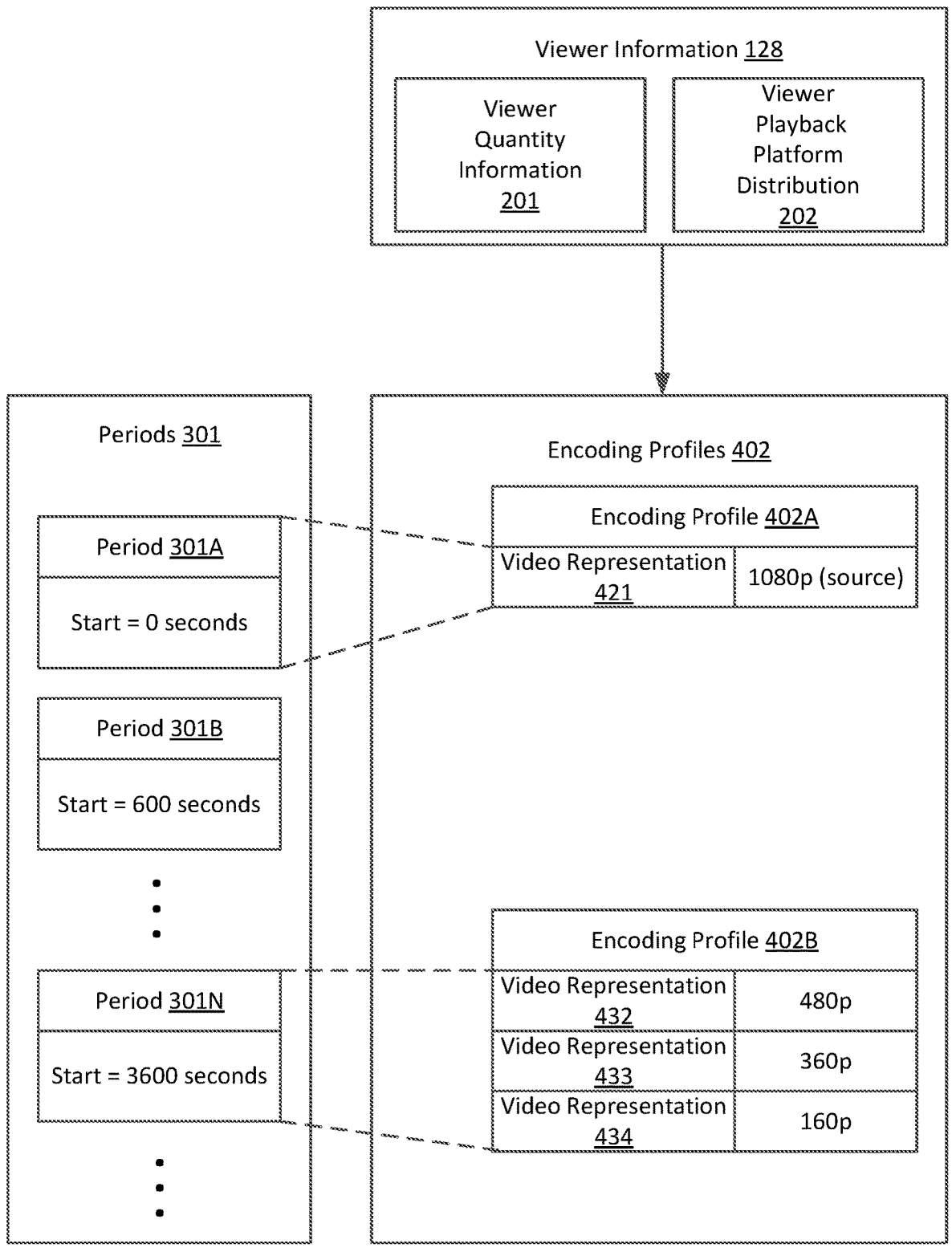
FIG. 4 is a diagram illustrating second example encoding profiles that may be used in accordance with the present description.

Referring now to FIGS. 3 and 4, some example encoding profiles for use the DASH protocol will now be described in detail. Specifically, as shown in FIG. 3, video item 101 may be transmitted in accordance with periods 301, which are periods of time during transmission of video item 101. In this example, each of the periods 301 have a duration of 600 seconds. As shown, period 301A starts at 0 seconds, which is an initiation of the transmission of video item 101. Additionally, period 301B starts 600 seconds into the transmission of video item 101. Furthermore, period 301N starts 3600 seconds into the transmission of video item 101.

As also shown in FIG. 3, encoding profiles 302 are used to transmit video item 101. Specifically, encoding profile 302A is used to transmit a first part of video item 101, which begins at the start of period 301A (at 0 seconds into the transmission of video item 101) and ends at the start of period 301N (at 3600 seconds into the transmission of video item 101). In this example, encoding profile 302A includes only a single video representation (video representation 321) of video item 101. As described above, in some examples, such as for some live streaming scenarios, it may be advantageous to initiate transmission of the video item 101 using only a single video representation that has the source image quality characteristics, which are the image quality characteristics that are used to transmit the video item 101 from the video source 151 to the video streaming service 100. Using only the source image characteristics may reduce the cost and time required to achieve minimal latency the is desired for live broadcasts. Thus, the in some examples, the initial encoding profile may include only a transmux video representation. In the transmux process, the video item 101 is transmitted using the source image characteristics, changing only the format of the video item 101, without decoding and re-encoding the video item 101. In the example of FIG. 3, video representation 321 is a transmux of the source video stream of video item 101, which includes the source resolution (1080p) that is used to transmit the video item 101 form the video source 151 to the video streaming service 100.

In the example of FIG. 3, the transcode profile manager 170 makes a determination to switch from encoding profile 302A to encoding profile 302B at the start of period 301N. Thus, encoding profile 302B is used to transmit a second part of video item 101, which begins at the start of period 301N (at 3600 seconds into the transmission of video item 101). The transcode profile manager 170 may make this determination based on viewer information 128. For example, in some cases, when the viewer quantity 201 indicates that viewership for video item 101 reaches a selected threshold quantity (e.g., one-thousand viewers), then this may trigger transcode profile manager to add additional video representations to video item 101. As shown, the encoding profile 302B includes four video representations, which are video representations 331-334. Thus, when switching from encoding profile 302A to encoding profile 302B, the quantity of video representations provided for video item 101 is increased from one to four.

The transcode profile manager 170 may also use the viewer playback platform distribution 202 to determine the respective image quality characteristics of the video representations 331-334 within the encoding profile 302B. For example, in some cases, due to network conditions and/or wireless carrier throttling, wireless service providers and mobile computing devices/smartphones may be less likely to provide a high quality of network service than land-based service providers and web-based computing devices. Thus, in some examples, if the majority of viewer playback platforms include land-based service providers and/or web-based computing devices, it may be beneficial to include a high image quality (e.g., 780p) video representation. By contrast, if the majority of viewer playback platforms include wireless service providers and/or mobile computing devices, it may not be beneficial to include a high image quality (e.g., 780p) video representation, as this would waste the extra bitrate and computing costs. Also, in some examples, a higher resolution and/or other image quality characteristics may sometimes be made available when a majority of viewers are viewing the video item in landscape mode as opposed to portrait mode, as the video players 150 may often occupy a larger screen area in landscape mode as opposed to portrait mode. In this example, video representation 331 is assigned a 780p resolution. Thus, in the example of FIG. 3, the viewer playback platform distribution 202 may indicate that the majority of viewer playback platforms include land-based service providers, non-smartphone computing devices, web-based computing devices and/or landscape mode viewers. As also shown in FIG. 3, video representation 332 is assigned a 480p resolution, video representation 333 is assigned a 360p resolution, and video representation 334 is assigned a 160p resolution.

Referring now to FIG. 4, another example is shown in which encoding profiles 402 are used to transmit video item 101. Specifically, encoding profile 402A includes video representation 421. In the example of FIG. 4, video representation 421 is a transmux of the source video stream of video item 101, which includes the source resolution (1080p) that is used to transmit the video item 101 form the video source 151 to the video streaming service 100.

In the example of FIG. 4, the transcode profile manager 170 makes a determination to switch from encoding profile 402A to encoding profile 402B at the start of period 301N. Thus, encoding profile 402B is used to transmit a second part of video item 101, which begins at the start of period 301N (at 3600 seconds into the transmission of video item 101). The transcode profile manager 170 may make this determination based on viewer information 128. For example, in some cases, when the viewer quantity 201 indicates that viewership for video item 101 reaches a selected threshold quantity (e.g., one-thousand viewers), then this may trigger transcode profile manager to add additional video representations to video item 101. As shown, the encoding profile 402B includes three video representations, which are video representations 432-434. Thus, when switching from encoding profile 402A to encoding profile 402B, the quantity of video representations provided for video item 101 is increased from one to three.

The transcode profile manager 170 may also use the viewer playback platform distribution 202 to determine the respective image quality characteristics of the video representations 433-434 within the encoding profile 402B. For example, in some cases, due to network conditions and/or wireless carrier throttling, wireless service providers and smartphone/mobile computing devices may be less likely to provide a high quality of network service than land-based service providers and web-based computing devices. Thus, in some examples, if the majority of viewer playback platforms include land-based service providers and/or web-based computing devices, it may be beneficial to include a high image quality (e.g., 780p) video representation. By contrast, if the majority of viewer playback platforms include wireless service providers and/or mobile computing devices, it may not be beneficial to include a high image quality (e.g., 780p) video representation, as this would waste the extra bitrate and computing costs. Also, in some examples, a higher resolution and/or other image quality characteristics may sometimes be made available when a majority of viewers are viewing the video item in landscape mode as opposed to portrait mode, as the video players 150 may often occupy a larger screen area in landscape mode as opposed to portrait mode. In this example, encoding profile 402B does not include video representation with a 780p resolution. Thus, in the example of FIG. 4, the viewer playback platform distribution 202 may indicate that the majority of viewer playback platforms include wireless service providers, smartphones, mobile computing devices and/or portrait mode viewers. As shown in FIG. 4, video representation 432 is assigned a 480p resolution, video representation 433 is assigned a 360p resolution, and video representation 434 is assigned a 160p resolution.

Unlike the DASH protocol that allows appending a new period to a master manifest, the HTTP Live Streaming (HLS) protocol specification doesn't recommend refreshing the master manifest. Thus, to accommodate the HLS specification, the encoding profiles have to use the same resolution and bitrate if there are overlap resolutions. This means that, when there is a switch of encoding profiles, each video representation that was provided by a former encoding profile needs to be retained in the subsequent encoding profile with the same image quality characteristics. This will avoid breaking the playback of viewers that joined the transmission prior to the switch to the new encoding profile and who only have the prior master manifest.

Referring now to FIG. 5, an example is shown of manifests that allow encoding profile switching that accommodates HLS. As shown, manifest 501 is for a first encoding profile, such as for transmitting an initial part of the video item 101. Manifest 501 includes only a single video representation that is a transmux of the source video stream of video item 101, which includes the source resolution (1080p) that is used to transmit the video item 101 form the video source 151 to the video streaming service 100.

Manifest 502 is for a second encoding profile, such as for transmitting a subsequent part of the video item 101. Manifest 502 specifies five video representations, including a 1080p video representation, a 780p video representation, a 480p video representation, a 360p video representation, and a 160p video representation. As should be appreciated, the 1080p video representation from manifest 501 is retained in manifest 502 with its respective image quality characteristics. Retaining the 1080p video representation from manifest 501 will avoid breaking the playback of viewers that joined the transmission prior to the switch to the second encoding profile and who only have manifest 501.

Figure 6:
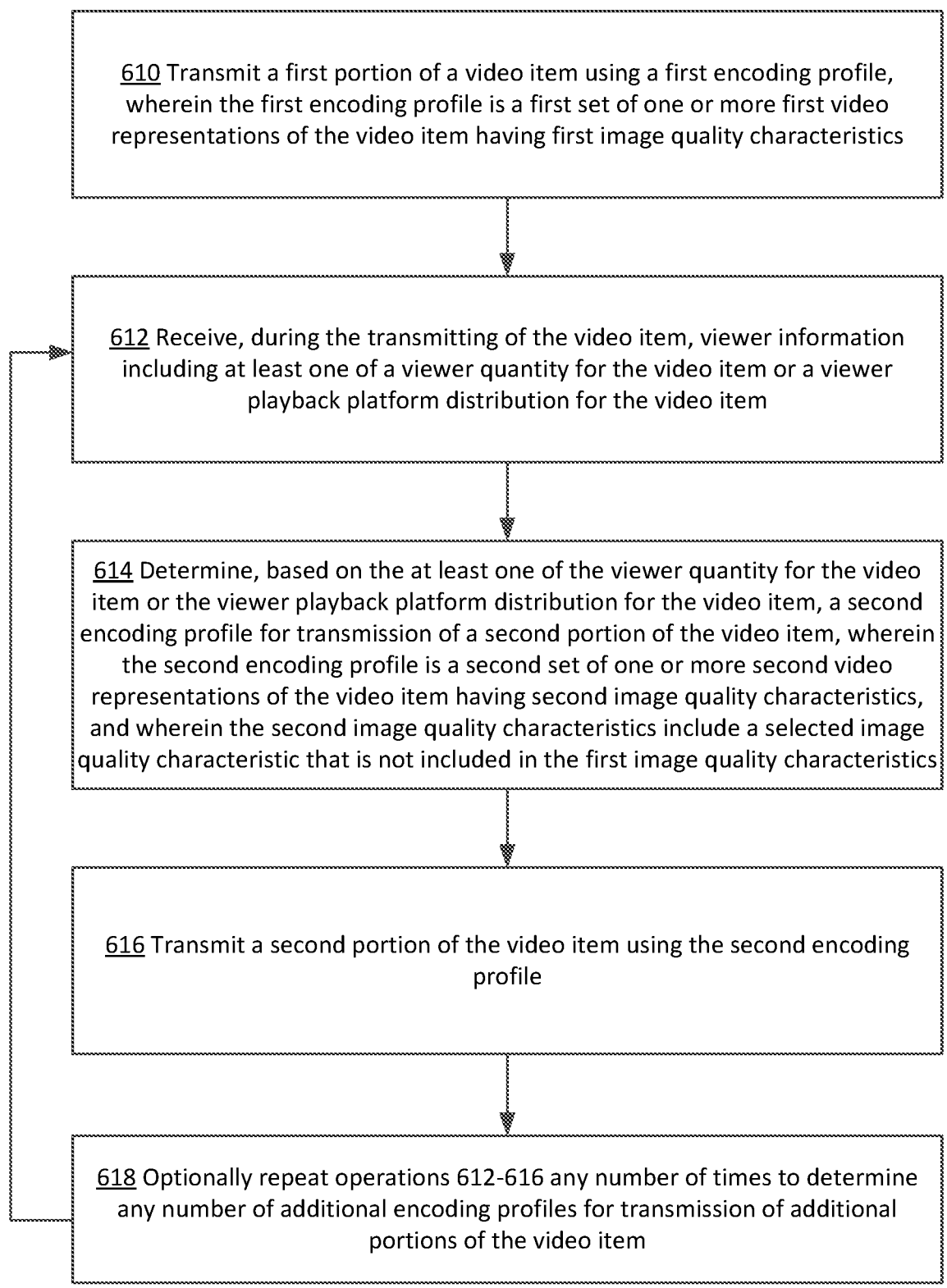
FIG. 6 is a flowchart illustrating an example seamless audience-aware encoding profile switching process that may be used in accordance with the present description.

FIG. 6 is a flowchart illustrating an example seamless audience-aware encoding profile switching process that may be used in accordance with the present description. Any, or all, of operations 610-618 of FIG. 6 may be performed by a video streaming service, such as video streaming service 100 of FIG. 1. At operation 610, a first portion of a video item is transmitted using a first encoding profile, wherein the first encoding profile is a first set of one or more first video representations of the video item having first image quality characteristics. The video item may be a live streaming video item. As described above, an encoding profile, as that term is used herein, refers to a set of one or more video representations into which at least part of a video item is encoded. Each video representation within the encoding profile has its own respective image quality characteristics, such as a respective resolution, a respective bitrate, etc. For scenarios in which an encoding profile includes a plurality of video representations, each of the video representations will include at least partially different image quality characteristics. In the example of FIG. 3, encoding profile 302A is used to transmit a first part of video item 101, which begins at the start of period 301A (at 0 seconds into the transmission of video item 101) and ends at the start of period 301N (at 3600 seconds into the transmission of video item 101). Thus, in the example of FIG. 3, the first encoding profile may be encoding profile 302A, which includes a single video representation (video representation 321) having 1080p resolution.

Accordingly, in the example of FIG. 3, the first image quality characteristics include 1080p resolution, which is the resolution of video representation 321. As described above, in some examples, such as for some live streaming scenarios, it may be advantageous to initiate transmission of the video item 101 using only a single video representation that has the source image quality characteristics, which are the image quality characteristics that are used to transmit the video item 101 from the video source 151 to the video streaming service 100. Using only the source image characteristics may reduce the cost and time required to achieve minimal latency the is desired for live broadcasts. Thus, the in some examples, the initial encoding profile may include only a transmux video representation. In the transmux process, the video item 101 is transmitted using the source image characteristics, changing only the format of the video item 101, without decoding and re-encoding the video item 101. In the example of FIG. 3, video representation 321 is a transmux of the source video stream of video item 101, which includes the source resolution (1080p) that is used to transmit the video item 101 form the video source 151 to the video streaming service 100. In some examples, the first set of the one or more first video representations may be generated by a first transcode server (e.g., transcode server 121 of FIG. 1), for example by transcoding a source version of the video item 101 and/or otherwise changing the format of the source version of the video item 101 (e.g., via a transmux process).

At operation 612, viewer information including indications of at least one of a viewer quantity for the video item or a viewer playback platform distribution for the video item is received during the transmitting of the video item. For example, the viewer information may be received during the transmitting of the first portion of the video item. As shown in FIG. 1, viewer information 118 may be obtained, by delivery service 125, based on data from video players 150. As shown in FIG. 2, the viewer information 128 may include viewer quantity 201 and viewer playback platform distribution 202. The viewer quantity 201 may be a quantity of viewers that are receiving transmission of the video item 101 at any given time. The viewer playback platform distribution 202 may indicate a distribution of viewer playback platforms among viewers of the video item 101 at any given time. A viewer playback platform refers to characteristics of a computing device, computing network and/or other computing resources that assist in playback of the video item 101 to a viewer, such as characteristics of computing devices (e.g., including device type, display mode, etc.) on which the video item 101 is played and/or characteristics of networks (e.g., types of network service providers) used to transmit the video item 101. For example, the viewer playback platform distribution 202 may indicate an amount (e.g., percentage) of viewers that are receiving transmission of the video item 101 via a wireless service provider in comparison to an amount (e.g., percentage) of viewers that are receiving transmission of the video item 101 via a land-based service provider. As another example, the viewer playback platform distribution 202 may indicate an amount (e.g., percentage) of viewers that are viewing the video item 101 via mobile computing devices (e.g., smartphones, etc.) in comparison to an amount (e.g., percentage) of viewers that are viewing the video item 101 via web-based computing devices (e.g., laptops, smart televisions, etc.). In one specific example, the viewer playback platform distribution 202 may indicate an amount (e.g., percentage) of viewers that are viewing the video item 101 via smartphones in comparison to an amount (e.g., percentage) of viewers that are viewing the video item 101 via non-smartphone computing devices (e.g., laptops, smart televisions, etc.). As yet another example, the viewer playback platform distribution 202 may indicate an amount (e.g., percentage) of viewers that are viewing the video item 101 in landscape mode in comparison to an amount (e.g., percentage) of viewers that are viewing the video item 101 in portrait mode.

At operation 614, a second encoding profile is determined, based on the at least one of the viewer quantity for the video item or the viewer playback platform distribution for the video item, for transmission of a second portion of the video item, wherein the second encoding profile is a second set of one or more second video representations of the video item having second image quality characteristics, and wherein the second image quality characteristics include a selected image quality characteristic that is not included in the first image quality characteristics. The selected image quality characteristic may be, for example, a selected resolution value or a selected bitrate value. In some examples, a first quantity of the one or more first video representations differs from a second quantity of the one or more second video representations. Additionally, in some examples, operation 614 may include determining, based on the at least one of the viewer quantity for the video item or the viewer playback platform distribution for the video item, to change, during transmission of the video item, an encoding profile video representation quantity for the video item. This may include, for example, determining, based on detecting that the viewer quantity has exceeded a threshold viewer quantity, to increase, during transmission of the video item, the encoding profile video representation quantity for the video item. For example, when switching from encoding profile 302A of FIG. 3 to encoding profile 302B, the quantity of encoding profile video representations is increased from one (e.g., video representation 321) to four (e.g., video representations 331-334). In some examples, the quantity of video representations may be increased (e.g., from one to four) based on detecting that the viewer quantity for video item 101 has exceeded a threshold viewer quantity (e.g., one-thousand viewers). Furthermore, in some examples, operation 614 may include determining, based on at least one of the viewer quantity for the video item or the viewer playback platform distribution for the video item, to change, during transmission of the video item, encoding profile image quality characteristics for the video item. For example, when switching from encoding profile 302A to encoding profile 302B, the encoding profile image quality characteristics are changed from a single resolution (1080p) to four other resolutions (780p, 480p, 360p and 160p).

In some examples, operation 614 may include selecting the second image quality characteristics of the one or more second video representations based, at least in part, on the viewer playback platform distribution 202 for the video item 101 that is obtained during transmission of the video item 101. Specifically, in some examples, the second image quality characteristics of the one or more second video representations may be selected based, at least in part, on an amount (e.g., percentage) of viewers that are receiving transmission of the video item 101 via a wireless service provider in comparison to an amount (e.g., percentage) of viewers that are receiving transmission of the video item 101 via a land-based service provider. As another example, the second image quality characteristics of the one or more second video representations may be selected based, at least in part, on an amount (e.g., percentage) of viewers that are viewing the video item 101 via mobile computing devices (e.g., smartphones, etc.) in comparison to an amount (e.g., percentage) of viewers that are viewing the video item 101 via web-based computing devices (e.g., laptops, smart televisions, etc.). As another example, the second image quality characteristics of the one or more second video representations may be selected based, at least in part, on an amount (e.g., percentage) of viewers that are viewing the video item 101 via smartphones in comparison to an amount (e.g., percentage) of viewers that are viewing the video item 101 via non-smartphone computing devices (e.g., laptops, smart televisions, etc.). As another example, the second image quality characteristics of the one or more second video representations may be selected based, at least in part, on an amount (e.g., percentage) of viewers that are viewing the video item 101 in landscape mode in comparison to an amount (e.g., percentage) of viewers that are viewing the video item 101 in portrait mode.

In the example of FIG. 3, the transcode profile manager 170 makes a determination to switch from encoding profile 302A to encoding profile 302B at the start of period 301N. Encoding profile 302B is used to transmit a second part of video item 101, which begins at the start of period 301N (at 3600 seconds into the transmission of video item 101). Thus, in the example of FIG. 3, the second encoding profile may be encoding profile 302B, which includes video representations 331-334. Video representation 331 has a resolution of 780p, video representation 332 has a resolution of 480p, video representation 333 has a resolution of 360p, and video representation 334 has a resolution of 160p. Accordingly, in the example of FIG. 3, the second image quality characteristics include 780p resolution, 480p resolution, 360p resolution and 160p resolution. In the example of FIG. 3, the selected image quality characteristic that is not included in the first image quality characteristics may be 780p resolution, 480p resolution, 360p resolution or 160p resolution (since none of these resolutions are included in the encoding profile 302A).

The transcode profile manager 170 may determine encoding profile 302B based on viewer information 128. For example, in some cases, when the viewer quantity 201 indicates that viewership for video item 101 reaches a selected threshold quantity (e.g., one-thousand viewers), then this may trigger transcode profile manager to add additional video representations to video item 101. As shown, the encoding profile 302B includes four video representations, which are video representations 331-334. Thus, when switching from encoding profile 302A to encoding profile 302B, the quantity of video representations provided for video item 101 is increased from one to four.

The transcode profile manager 170 may also use the viewer playback platform distribution 202 to determine the respective image quality characteristics of the video representations 331-334 within the encoding profile 302B. For example, in some cases, due to network conditions and/or wireless carrier throttling, wireless service providers and mobile computing devices may be less likely to provide a high quality of network service than land-based service providers and web-based computing devices. Thus, in some examples, if the majority of viewer playback platforms include land-based service providers and/or web-based computing devices, it may be beneficial to include a high image quality (e.g., 780p) video representation. By contrast, if the majority of viewer playback platforms include wireless service providers and/or mobile computing devices, it may not be beneficial to include a high image quality (e.g., 780p) video representation, as this would waste the extra bitrate and computing costs. Also, in some examples, a higher resolution and/or other image quality characteristics may sometimes be made available when a majority of viewers are viewing the video item in landscape mode as opposed to portrait mode, as the video players 150 may often occupy a larger screen area in landscape mode as opposed to portrait mode. In the example of FIG. 3, video representation 331 is assigned a 780p resolution. Thus, in the example of FIG. 3, the viewer playback platform distribution 202 may indicate that the majority of viewer playback platforms include land-based service providers, web-based computing devices and/or landscape mode viewers.

In the example of FIG. 4, the transcode profile manager 170 makes a determination to switch from encoding profile 402A to encoding profile 402B at the start of period 301N. Encoding profile 402B is used to transmit a second part of video item 101, which begins at the start of period 301N (at 3600 seconds into the transmission of video item 101). Thus, in the example of FIG. 4, the second encoding profile may be encoding profile 402B, which includes video representations 431-433. Video representation 431 has a resolution of 480p, video representation 432 has a resolution of 360p, and video representation 433 has a resolution of 160p. Accordingly, in the example of FIG. 4, the second image quality characteristics include 480p resolution, 360p resolution and 160p resolution. In the example of FIG. 4, the selected image quality characteristic that is not included in the first image quality characteristics may be 480p resolution, 360p resolution or 160p resolution (since none of these resolutions are included in the encoding profile 402A).

The transcode profile manager 170 may determine encoding profile 402B based on viewer information 128. For example, in some cases, when the viewer quantity 201 indicates that viewership for video item 101 reaches a selected threshold quantity (e.g., one-thousand viewers), then this may trigger transcode profile manager to add additional video representations to video item 101. As shown, the encoding profile 402B includes three video representations, which are video representations 432-434. Thus, when switching from encoding profile 402A to encoding profile 402B, the quantity of video representations provided for video item 101 is increased from one to three.

The transcode profile manager 170 may also use the viewer playback platform distribution 202 to determine the respective image quality characteristics of the video representations 433-434 within the encoding profile 402B. For example, in some cases, due to network conditions and/or wireless carrier throttling, wireless service providers and mobile computing devices may be less likely to provide a high quality of network service than land-based service providers and web-based computing devices. Thus, in some examples, if the majority of viewer playback platforms include land-based service providers and/or web-based computing devices, it may be beneficial to include a high image quality (e.g., 780p) video representation. By contrast, if the majority of viewer playback platforms include wireless service providers and/or mobile computing devices, it may not be beneficial to include a high image quality (e.g., 780p) video representation, as this would waste the extra bitrate and computing costs. Also, in some examples, a higher resolution and/or other image quality characteristics may sometimes be made available when a majority of viewers are viewing the video item in landscape mode as opposed to portrait mode, as the video players 150 may often occupy a larger screen area in landscape mode as opposed to portrait mode. In the example of FIG. 4, encoding profile 402B does not include video representation with a 780p resolution. Thus, in the example of FIG. 4, the viewer playback platform distribution 202 may indicate that the majority of viewer playback platforms include wireless service providers, mobile computing devices and/or portrait mode viewers.

At operation 616, a second portion of the video item is transmitted using the second encoding profile. As described above, in the example of FIG. 3, encoding profile 302B is used to transmit a second part of video item 101, which begins at the start of period 301N (at 3600 seconds into the transmission of video item 101). Thus, in the example of FIG. 3, the second encoding profile may be encoding profile 302B, which includes video representations 331-334. As also described above, in the example of FIG. 4, encoding profile 402B is used to transmit a second part of video item 101, which begins at the start of period 301N (at 3600 seconds into the transmission of video item 101). Thus, in the example of FIG. 4, the second encoding profile may be encoding profile 402B, which includes video representations 431-433. In some examples, the second set of the one or more second video representations may be generated by a second transcode server (e.g., transcode server 122 of FIG. 1), for example by transcoding a source version of the video item 101 and/or otherwise changing the format of the source version of the video item 101 (e.g., via a transmux process).

At operation 618, operations 612-616 may optionally be repeated any number of times to determine any number of additional encoding profiles for transmission of additional portions of the video item. For example, viewer information received during transmission of the second portion of the video item may be used to determine a third encoding profile that is used to transmit a third portion of the video item. Depending upon the received viewer information, the third encoding profile could have more, or less, video representations than the second encoding profile and may also have at least partially different image quality characteristics (e.g., resolution bitrate, etc.) than the second encoding profile.

Figure 7:
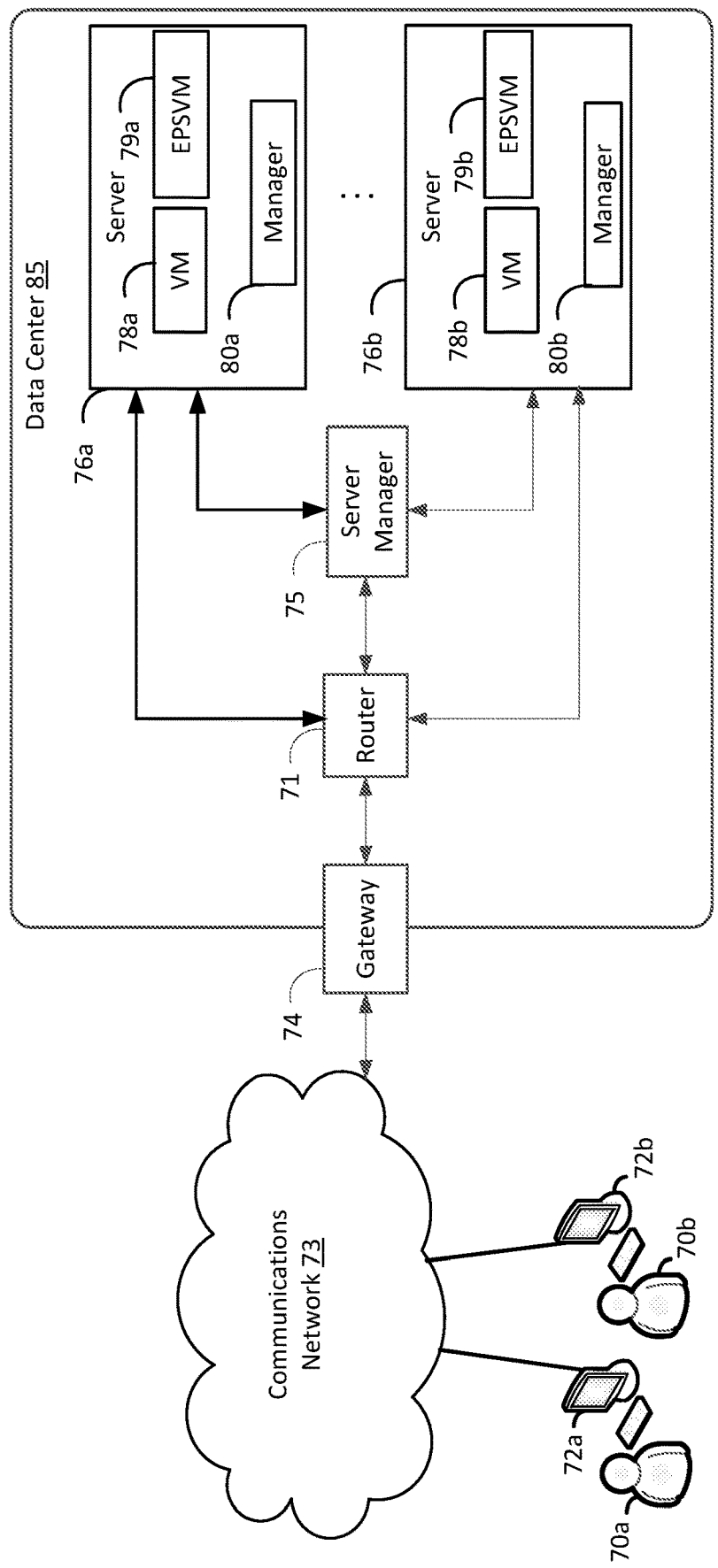
FIG. 7 is a diagram illustrating an example system for transmitting and providing data that may be used in accordance with the present description.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also include encoding profile switching virtual machines (EPSVM's) 79a-b, which are virtual machines that are configured to execute any, or all, of the audience-aware encoding profile switching techniques described herein.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
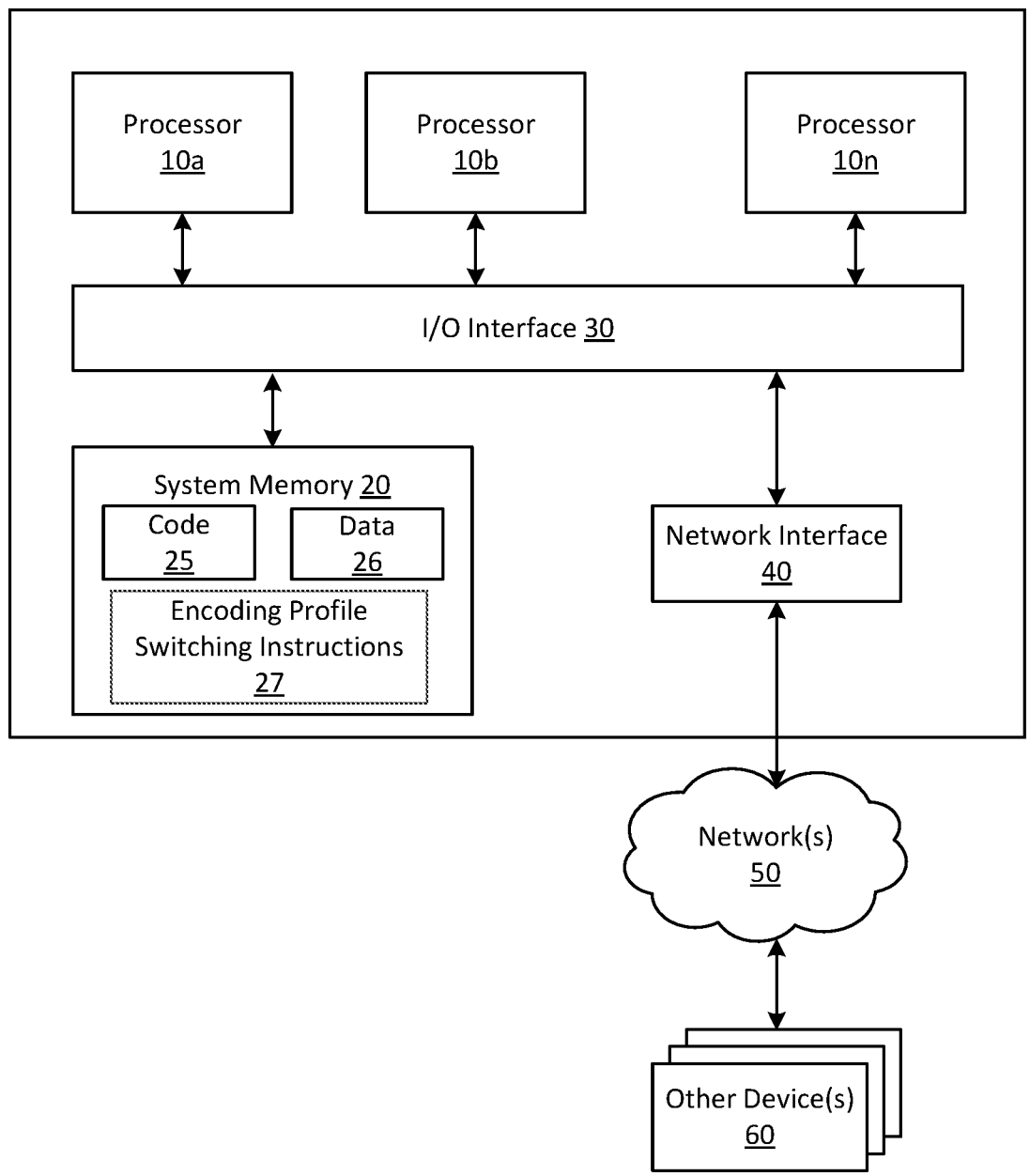
FIG. 8 is a diagram illustrating an example computing system that may be used in accordance with the present description.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes encoding profile switching instructions 27, which are instructions for executing any, or all, of the audience-aware encoding profile switching techniques described herein.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance playback platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein instructions that, upon execution by the one or more processors, cause the one or more processors to perform operations comprising:
transmitting, by a video streaming service, a first portion of a live streaming video item using a first encoding profile, wherein the first encoding profile is a first set of one or more first video representations of the live streaming video item having first image quality characteristics;
receiving, by the video streaming service, during the transmitting of the first portion of the live streaming video item, viewer information including at least one of a viewer quantity for the live streaming video item or a viewer playback platform distribution for the live streaming video item;
determining, by the video streaming service, based on the at least one of the viewer quantity for the live streaming video item or the viewer playback platform distribution for the live streaming video item, a second encoding profile for transmission of a second portion of the live streaming video item, wherein the second encoding profile is a second set of one or more second video representations of the live streaming video item having second image quality characteristics, wherein the second image quality characteristics include a selected image quality characteristic that is not included in the first image quality characteristics, and wherein the selected image quality characteristic is a selected resolution value or a selected bitrate value; and
transmitting, by the video streaming service, a second portion of the live streaming video item using the second encoding profile.

2. The computing system of claim 1, wherein a first quantity of the one or more first video representations differs from a second quantity of the one or more second video representations.

3. The computing system of claim 1, wherein the viewer playback platform distribution indicates first amounts of viewers that are viewing the live streaming video item via mobile computing devices in comparison to second amounts of viewers that are viewing the live streaming video item via web-based computing devices.

4. The computing system of claim 1, wherein determining, by the video streaming service, based on the at least one of the viewer quantity for the live streaming video item or the viewer playback platform distribution for the live streaming video item, a second encoding profile for transmission of a second portion of the live streaming video item comprises:
determining, based on the at least one of the viewer quantity for the live streaming video item or the viewer playback platform distribution for the live streaming video item, to change, during transmission of the live streaming video item, an encoding profile video representation quantity for the live streaming video item.

5. The computing system of claim 4, wherein determining, based on the at least one of the viewer quantity for the video item or the viewer playback platform distribution for the video item, to change, during transmission of the video item, an encoding profile video representation quantity for the video item comprises:
determining, based on detecting that the viewer quantity has exceeded a threshold viewer quantity, to increase, during the transmission of the video item, the encoding profile video representation quantity for the video item.

6. A computer-implemented method comprising:
transmitting a first portion of a video item using a first encoding profile, wherein the first encoding profile is a first set of one or more first video representations of the video item having first image quality characteristics;
receiving, during the transmitting of the first portion of the video item, viewer information including at least one of a viewer quantity for the video item or a viewer playback platform distribution for the video item;
determining, based on the at least one of the viewer quantity for the video item or the viewer playback platform distribution for the video item, a second encoding profile for transmission of a second portion of the video item, wherein the second encoding profile is a second set of one or more second video representations of the video item having second image quality characteristics, and wherein the second image quality characteristics include a selected image quality characteristic that is not included in the first image quality characteristics; and transmitting a second portion of the video item using the second encoding profile.

7. The computer-implemented method of claim 6, wherein the selected image quality characteristic is a selected resolution value.

8. The computer-implemented method of claim 6, wherein the selected image quality characteristic is a selected bitrate value.

9. The computer-implemented method of claim 6, wherein a first quantity of the one or more first video representations differs from a second quantity of the one or more second video representations.

10. The computer-implemented method of claim 6, wherein the viewer playback platform distribution indicates first amounts of viewers that are viewing the video item via mobile computing devices in comparison to second amounts of viewers that are viewing the video item via web-based computing devices.

11. The computer-implemented method of claim 6, wherein determining, based on the at least one of the viewer quantity for the video item or the viewer playback platform distribution for the video item, a second encoding profile for transmission of a second portion of the video item comprises:
   determining, based on the at least one of the viewer quantity for the video item or the viewer playback platform distribution for the video item, to change, during transmission of the video item, an encoding profile video representation quantity for the video item.

12. The computer-implemented method of claim 11, wherein determining, based on the at least one of the viewer quantity for the video item or the viewer playback platform distribution for the video item, to change, during transmission of the video item, an encoding profile video representation quantity for the video item comprises:
   determining, based on detecting that the viewer quantity has exceeded a threshold viewer quantity, to increase, during the transmission of the video item, the encoding profile video representation quantity for the video item.

13. The computer-implemented method of claim 6, wherein determining, based on the at least one of the viewer quantity for the video item or the viewer playback platform distribution for the video item, a second encoding profile for transmission of a second portion of the video item comprises:
   selecting, based, at least in part, on the viewer playback platform distribution, the second image quality characteristics of the one or more second video representations.

14. The computer-implemented method of claim 6, wherein the video item is a live streaming video item.

15. One or more non-transitory computer-readable storage media having stored thereon computing instructions that, upon execution by one or more computing processors, cause the one or more computing processors to perform operations comprising:
   transmitting a first portion of a video item using a first encoding profile, wherein the first encoding profile is a first set of one or more first video representations of the video item having first image quality characteristics;
   receiving, during the transmitting of the first portion of the video item, viewer information including at least one of a viewer quantity for the video item or a viewer playback platform distribution for the video item;
   determining, based on the at least one of the viewer quantity for the video item or the viewer playback platform distribution for the video item, a second encoding profile for transmission of a second portion of the video item, wherein the second encoding profile is a second set of one or more second video representations of the video item having second image quality characteristics, and wherein the second image quality characteristics include a selected image quality characteristic that is not included in the first image quality characteristics; and
   transmitting a second portion of the video item using the second encoding profile.

16. The one or more non-transitory computer-readable storage media of claim 15, wherein the selected image quality characteristic is a selected resolution value or a selected bitrate value.

17. The one or more non-transitory computer-readable storage media of claim 15, wherein determining, based on the at least one of the viewer quantity for the video item or the viewer playback platform distribution for the video item, a second encoding profile for transmission of a second portion of the video item comprises:
   selecting, based, at least in part, on the viewer playback platform distribution, the second image quality characteristics of the one or more second video representations.

18. The one or more non-transitory computer-readable storage media of claim 15, wherein the viewer playback platform distribution indicates first amounts of viewers that are viewing the video item via mobile computing devices in comparison to second amounts of viewers that are viewing the video item via web-based computing devices.

19. The one or more non-transitory computer-readable storage media of claim 15, wherein determining, based on the at least one of the viewer quantity for the video item or the viewer playback platform distribution for the video item, a second encoding profile for transmission of a second portion of the video item comprises:
   determining, based on the at least one of the viewer quantity for the video item or the viewer playback platform distribution for the video item, to change, during transmission of the video item, an encoding profile video representation quantity for the video item.

20. The one or more non-transitory computer-readable storage media of claim 19, wherein determining, based on the at least one of the viewer quantity for the video item or the viewer playback platform distribution for the video item, to change, during transmission of the video item, an encoding profile video representation quantity for the video item comprises:
   determining, based on detecting that the viewer quantity has exceeded a threshold viewer quantity, to increase, during the transmission of the video item, the encoding profile video representation quantity for the video item.

* * * * *